(12) United States Patent
Williams, Sr. et al.

(10) Patent No.: US 8,449,952 B2
(45) Date of Patent: May 28, 2013

(54) METHOD AND SYSTEM FOR COATING VINYL PRODUCTS

(75) Inventors: Peter E. Williams, Sr., Bayport, NY (US); Paul Wesnofske, Greenlawn, NY (US)

(73) Assignee: Eastern Wholesale Fence Co., Inc., Medford, NY (US)

( * ) Notice: Subject to any disclaimer, the term of this patent is extended or adjusted under 35 U.S.C. 154(b) by 197 days.

(21) Appl. No.: 12/879,914

(22) Filed: Sep. 10, 2010

(65) Prior Publication Data
US 2012/0064261 A1 Mar. 15, 2012

(51) Int. Cl.
| B05D 1/28 | (2006.01) |
| B05D 5/00 | (2006.01) |
| C23C 18/00 | (2006.01) |
| C23C 14/28 | (2006.01) |
| H05B 6/00 | (2006.01) |
| B05C 1/00 | (2006.01) |

(52) U.S. Cl.
USPC .............. 427/595; 427/428.01; 427/428.06; 427/428.08

(58) Field of Classification Search
USPC .............. 118/200, 207, 255, 264, 242, 216, 118/221, 222, 224; 427/595, 428.01, 428.06, 427/428.04, 428.08
See application file for complete search history.

(56) References Cited

U.S. PATENT DOCUMENTS

| 2,761,167 | A |  | 9/1956 | Bridgford |
| 3,810,744 | A | * | 5/1974 | Pittman ............................ 65/42 |
| 4,353,324 | A |  | 10/1982 | Schnittker |
| 4,573,233 | A |  | 3/1986 | Stoop |
| 5,035,022 | A |  | 7/1991 | Iuliano et al. |
| 5,203,941 | A |  | 4/1993 | Spain et al. |
| 5,284,693 | A |  | 2/1994 | Spain et al. |
| 5,405,675 | A |  | 4/1995 | Sawka et al. |
| 5,506,031 | A |  | 4/1996 | Spain et al. |
| 5,601,278 | A | * | 2/1997 | Graber ............................ 256/66 |
| 5,662,977 | A |  | 9/1997 | Spain et al. |
| 6,219,877 | B1 |  | 4/2001 | Lowrey et al. |
| 6,730,388 | B2 | * | 5/2004 | MacQueen et al. ........... 428/141 |
| 6,733,870 | B2 |  | 5/2004 | Enlow et al. |
| 7,418,903 | B2 | * | 9/2008 | Liang et al. ................... 101/486 |
| 7,438,017 | B2 |  | 10/2008 | Jabbari et al. |
| 8,230,804 | B1 | * | 7/2012 | Barbieri ......................... 118/222 |
| 2002/0142098 | A1 | * | 10/2002 | Amin-Javaheri .......... 427/385.5 |
| 2004/0032054 | A1 | * | 2/2004 | Moeller et al. ................. 264/255 |
| 2005/0042382 | A1 |  | 2/2005 | Palfrey et al. |
| 2006/0000046 | A1 |  | 1/2006 | Wren et al. |
| 2006/0172071 | A1 |  | 8/2006 | Marceau et al. |
| 2007/0092701 | A1 |  | 4/2007 | Jeng |
| 2007/0136972 | A1 |  | 6/2007 | Atteberry |
| 2008/0010924 | A1 | * | 1/2008 | Pietruczynik et al. ....... 52/309.1 |
| 2009/0074980 | A1 |  | 3/2009 | Jabbari et al. |
| 2009/0188559 | A1 | * | 7/2009 | Nesbitt ......................... 136/256 |
| 2010/0119831 | A1 | * | 5/2010 | Belluz ......................... 428/411.1 |

* cited by examiner

*Primary Examiner* — Michael Cleveland
*Assistant Examiner* — Michael Wieczorek
(74) *Attorney, Agent, or Firm* — Scully, Scott, Murphy & Presser, P.C.

(57) ABSTRACT

A method and system for coating a vinyl workpiece includes denibbing the workpiece and deionizing the air around the workpiece. The workpiece is roll coated using a roll coating machine, wherein the roll coating machine includes a plurality of engraving rollers. An angular surface of the workpiece is roll coated using a corresponding angularly positioned application roller. The workpiece is coated with an ultraviolet (UV) curable coating using a vacuum coating machine. The UV coating is cured using the vacuum coating machine.

10 Claims, 4 Drawing Sheets

METHOD AND SYSTEM FOR COATING VINYL PRODUCTS

FIELD OF THE INVENTION

The present invention generally relates to a method and system for coating a vinyl workpiece, and more specifically, the present invention relates to a method and system for coating a Polyvinyl Chloride (PVC) workpiece.

BACKGROUND OF THE INVENTION

Painting and/or coating plastic such as vinyl pieces is known to be difficult due to the chemical properties of vinyl. For example, Polyvinyl Chloride (PVC) is known to be difficult to paint or coat as the surface of PVC element does not readily lend itself to adherence by the paint. Vinyl articles such as vinyl slats in window blinds are used in the home, and vinyl shingles are used in home building. Other vinyl products include decking and fencing components.

In the area of fencing, fencing components can be manufactured out of various materials, including wood, metal, or PVC. PVC composed fencing is widely used and is typically white or without coloration or a colored pattern because of the difficulty in painting or coating PVC, and the susceptibility to weathering or fading.

It would therefore be desirable to provide a method and system for coating surfaces of vinyl components with increased adherence to the vinyl and resistant to fading and weathering. It is also desirable to provide a method and system of coating surfaces of vinyl to provide colors and patterns, such as wood grain, which would be aesthetically appealing.

SUMMARY OF THE INVENTION

In an aspect of the invention, a method for coating a vinyl workpiece comprises: providing a vinyl workpiece, the workpiece including a planar top and bottom surfaces; denibbing the workpiece; deionizing air around the workpiece; roll coating the workpiece using a roll coating machine, the roll coating machine including a plurality of engraving rollers, at least one of the rollers having an engraved image for printing the image on the workpiece; roll coating at least one angular surfaces of the workpiece using at least one corresponding angularly positioned application roller, the application roller having a specified hardness; the angularly positioned application roller being positioned at a specified angle from a horizontal plane defined by the top surface of the workpiece; coating the workpiece with an ultraviolet (UV) curable coating using a vacuum coating machine; curing the UV coating using the vacuum coating machine for applying a clear coat.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION OF THE INVENTION

Figure 1:
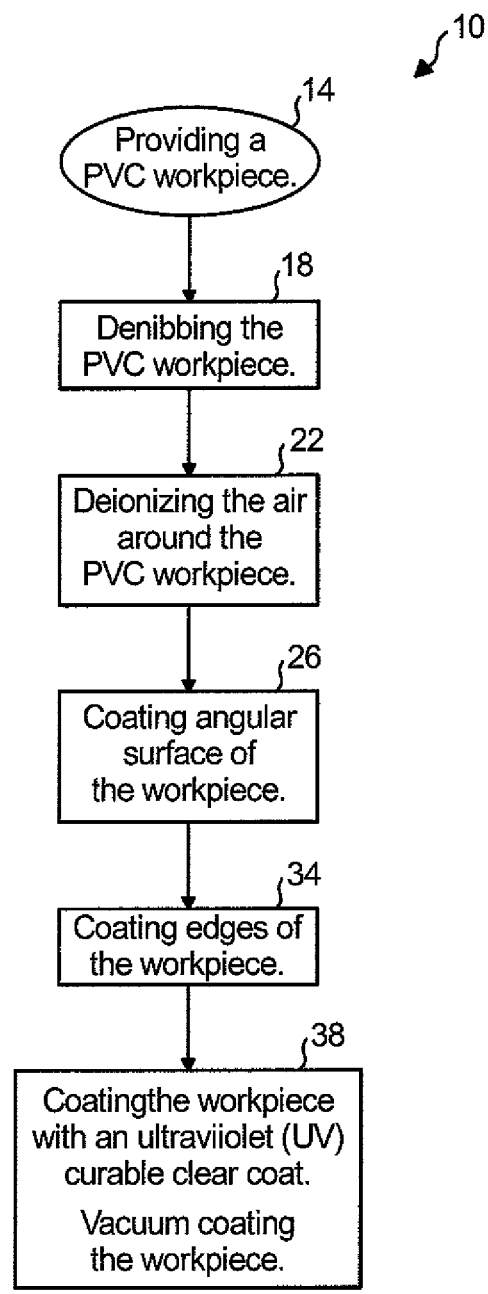
FIG. 1 is a flow chart depicting a method of the invention according to one embodiment of the invention.
Figure 2:
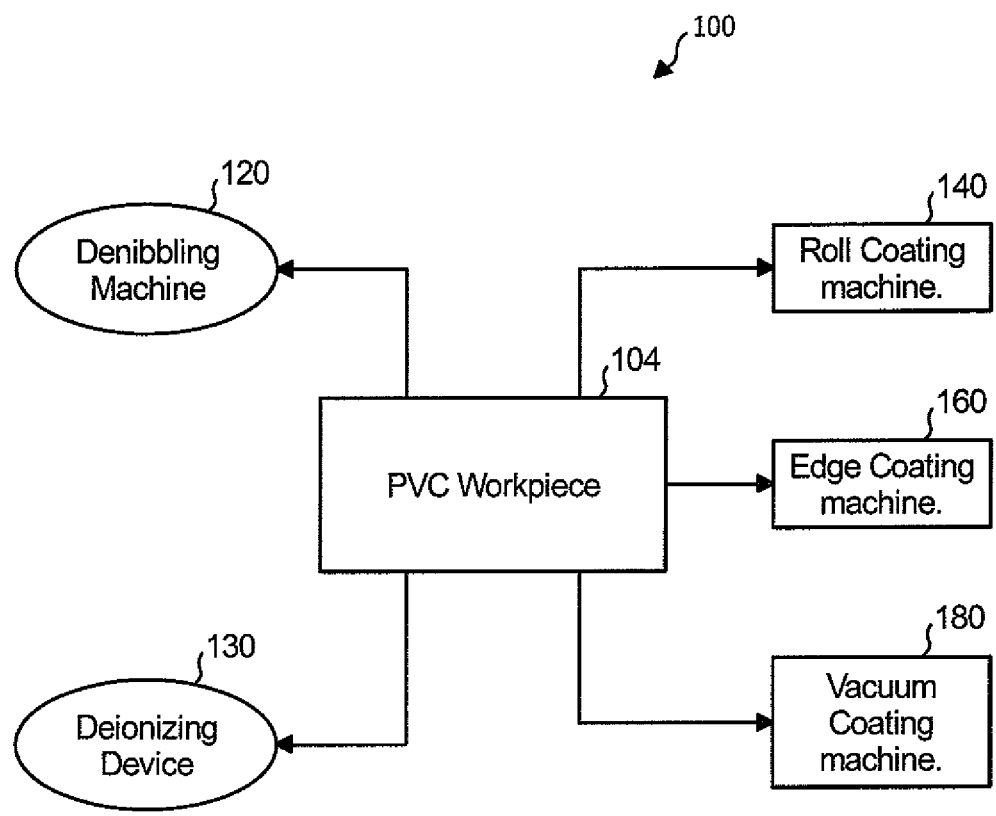
FIG. 2 is a schematic diagram depicting a workpiece and processing machines according to the embodiment of the invention depicted in FIG. 1.
Figure 3:
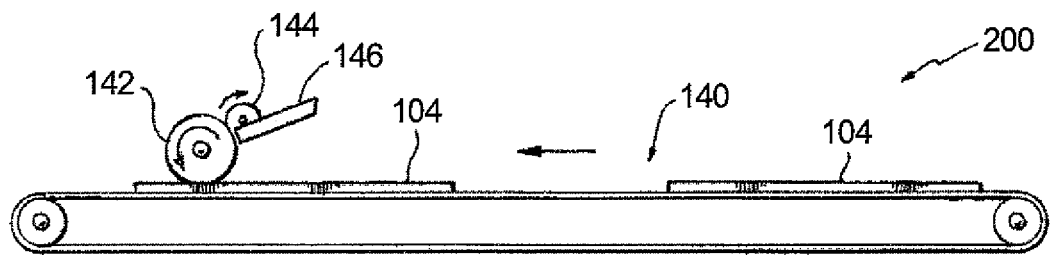
FIG. 3 is a side elevational view of a coating machine including a workpiece and an engraving roller.
Figure 4:
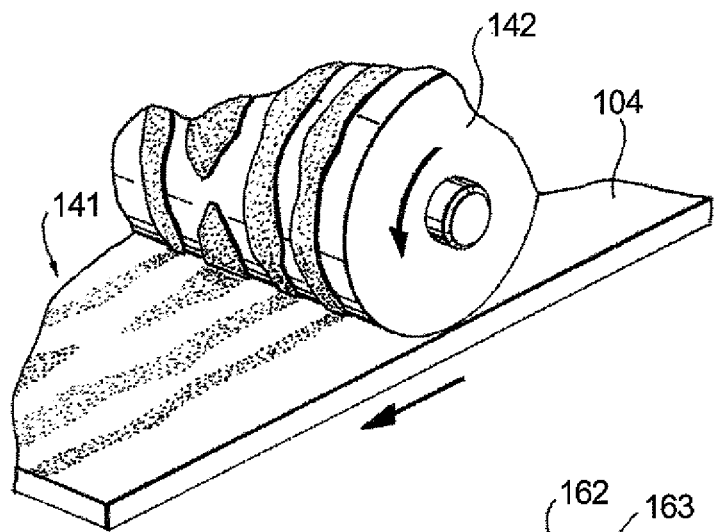
FIG. 4 is an isometric view of the engraving roller shown in FIG. 3 coating a workpiece.
Figure 5:
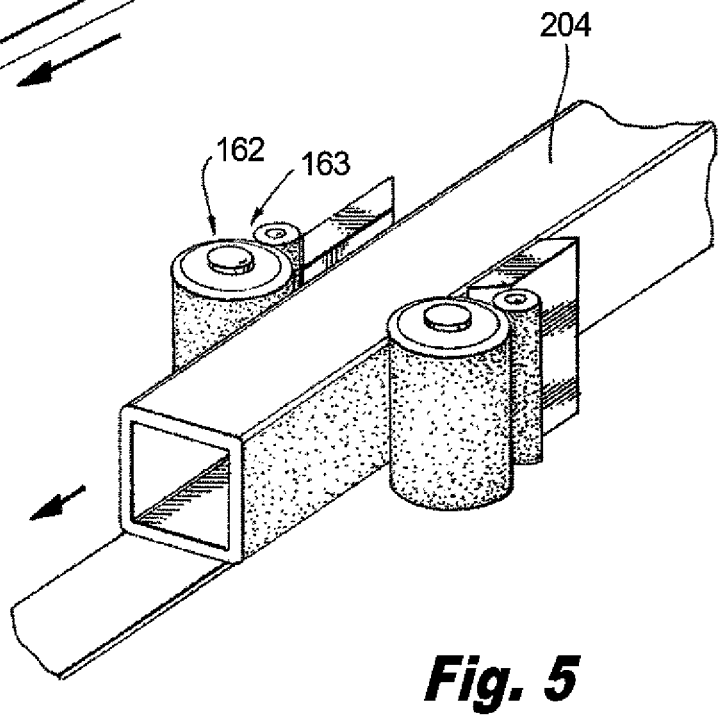
FIG. 5 is an isometric view of side rollers coating the sides of a workpiece according to an embodiment of the invention.
Figure 6:
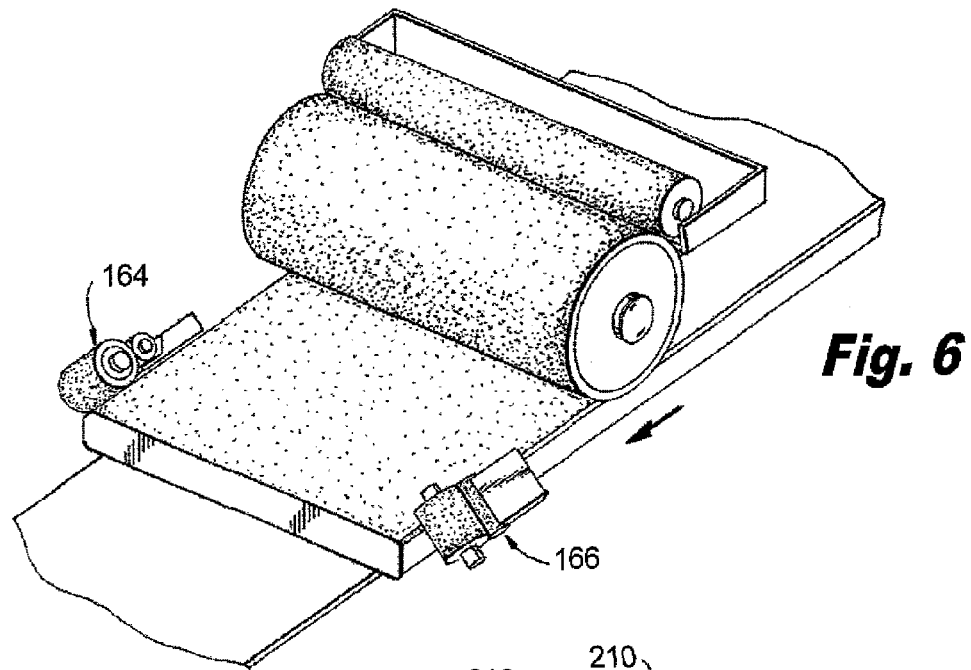
FIG. 6 is an isometric view of angled side rollers coating the sides of a workpiece according to an embodiment of the invention.
Figure 7:
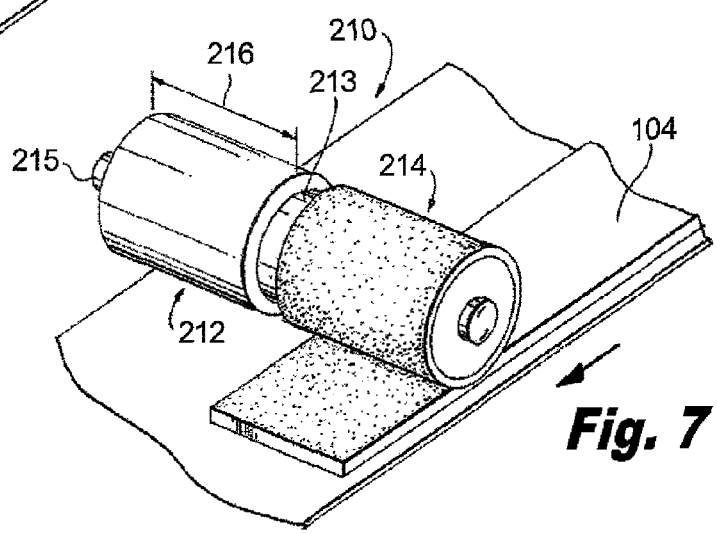
FIG. 7 is an isometric view of a split roller according to an embodiment of the invention.
Figure 9:
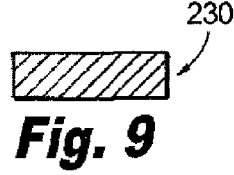
FIG. 9 is a cross sectional side elevational view of a rectangular workpiece.
Figure 10:
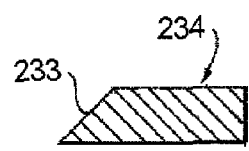
FIG. 10 is a cross sectional side elevational view of a workpiece having an angled surface.
Figure 11:
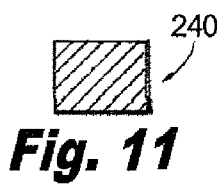
FIG. 11 is a cross sectional side elevational view of a square workpiece.

Referring to FIGS. 1-2, a method of coating a vinyl workpeice according to an embodiment of the invention includes multiple steps. An embodiment of an article or product using the method of the present invention includes the: "Grand Illusions Series™" by Illusions Vinyl Fence™. The method 10 according to an embodiment of the present invention includes providing a vinyl workpiece in step 14. The workpiece may be comprised of Polyvinyl Chloride (PVC) and may be, for example, a fence post, fence rail, or fence end cap or other vinyl or PVC article. The following embodiment of the method of the invention provides wood grain coatings of a PVC workpiece. For example, a fence rail (having a flat profile) is rectangular shaped 230 (see FIG. 9) and includes top and bottom planar surfaces, at least one vertical edge at a 90 degree angle from the top and bottom surfaces. A rectangularly shaped workpiece 234 (having a rectangular cross section) may include an inclined edge 233 (see FIG. 10) which angularly extends from the top and bottom surfaces. A post may have a square cross-section 240 (see FIG. 11). Each of the planar top and bottom surfaces needs to be coated individually. In another example, a fence post includes four planar sides which need to be coated individually. Step 18 includes denibbing the PVC workpiece. The denibbing step 18 may include a denibbing machine 120 for denibbing the workpiece 104 (FIG. 3). Step 22 includes deionizing the air around the PVC workpiece. The deionization may be accomplished using one or more deionizing devices 130 (FIG. 2), such as deionizing air guns. Deionizing the air discourages static dust on the workpiece.

Step 26 includes roll coating the PVC workpiece using a roll coating machine 140 or apparatus. The roll coating machine 140 includes an engraving roller to print an engraved image on the PVC workpiece. The roll coating machine 140 also coats a plurality of angular surfaces of the workpiece using corresponding application rollers, in step 26. The application rollers may be positioned at specified angles from a horizontal plane defined by the top or bottom surface of the workpiece. Further, the roll coating machine may include a roller having a specified diameter related to a specified length of a PVC workpiece, such that one rotation of the roller corresponds to the length of a coated surface of the workpiece. For example, the roller may have a specified diameter to provide a repeatable six foot coating in one completed rotation of the roller. Further, a roller can be split into two parts which independently print two different surfaces. The coating of the vinyl workpiece includes paints which are solvent based, i.e., the paints include a solvent for varying the viscosity of the paint.

In step 34 an edge coating machine 160 coats the vertical edges of the workpiece 104 which are at a 90 degree angle from the top surface of the workpiece. In one embodiment of the invention, the roll coating machine includes application rollers at a 45 degree angle in relation to the top surface of the workpiece. In one embodiment of the invention, a specified number of application rollers, for example, two rollers, are at 45 degree angles relative to the top surface of a planar workepiece. The application rollers have a specified hardness. The hardness is specified in units designate as "shore" for measuring the hardness of a material, or a Rockwell hardness test may also be used. The Shore hardness is measured with an apparatus known as a Durometer and consequently is also known as "Durometer hardness". For example, in the embodiment of the invention above, one of the application rollers is positioned at 45 degrees and is of a 30 shore hardness, and one of the application rollers is positioned at 45 degrees and is of an 18 shore hardness. The angle and hardness of the rollers provide improved coverage of the workpiece without bending, buckling or damaging the workpiece.

Step 38 of the method includes coating the workpiece with an ultraviolet (UV) curable coating using a vacuum coating machine 180. The UV coating is cured with UV lamps, thus providing a clear coat on the workpiece using the vacuum coating machine. The coating step 38 includes vacuum coating the workpiece with a color coating. The clear coating step may be repeated.

In operation, an embodiment of a system 200 for coating a vinyl workpiece is depicted in FIGS. 3-7 and the schematic diagram of FIG. 2, which follow the method shown in FIG. 1. The system 200 includes a PVC workpiece 104, such as a fence rail. The PVC workpiece is passed through the denibbing machine 120. The PVC workpiece 104 is deionized using a one or more deionizing devices 130, such as deionizing air guns. The workpiece is passed through the roll coating machine 140. The roll coating machine 140 includes an engraving roller 142 to print or coat an engraved image 141 on the PVC workpiece 104. The engraving roller 142 rollingly mates with an ink or paint roller 144 which draws paint from an ink or paint reservoir or fountain 146.

The edge coating machine 160 coats a plurality of angular surfaces of the workpiece using corresponding application rollers. A plurality of application rollers may be positioned at specified angles from a horizontal plane defined by the top or bottom surface of the workpiece. For example, in referring to FIG. 5, the rollers 162 are positioned to coat the sides of a fence post 204. The rollers 162 rotate about an axis 163 which is at a ninety degree angle from a horizontal plane. Thus, the edge coating machine 160 coats the vertical edges of the workpiece 104 which are at a 90 degree angle from the top surface of the workpiece.

In another embodiment of the invention, the roll coating machine includes application rollers 164 at a 45 degree angle in relation to the top surface of the workpiece. The application rollers 164 rotate about an axis 166 positioned at a 45 degree angle from a horizontal plane. As discussed above, in one embodiment of the invention, a specified number of application rollers, for example, two application rollers, are at 45 degree angles relative to the top surface of a planar workepiece. For example, in the embodiment of the invention above, one of the application rollers positioned at 45 degrees is of about 30 shore hardness, and one of the application rollers positioned at 45 degrees is of about 18 shore hardness.

The workpiece is passed through a vacuum coating machine 180 for coating the workpiece with an ultraviolet (UV) curable coating. The UV coating is cured with UV lamps, thus providing a clear coat on the workpiece using the vacuum coating machine. A color coating may be added using the vacuum coating machine.

Further, a roller 210 can be split into two parts 212, 214, with a demarcation 213 down the center. The roller 210 independently prints two different surfaces of a workpiece. The roller 210 may be split into specified lengths 216, for example, about two 24 inch segments 212, 214, for independently coating two different products.

Figure 8:
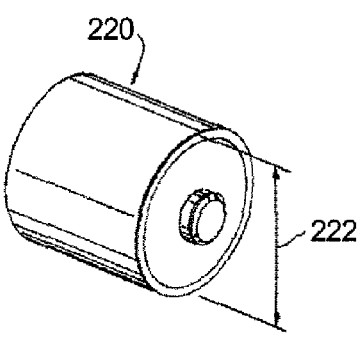
FIG. 8 is an isometric view of an engraving roller having a specified dimension.

Further, the edge coating machine 160 may include a roller 220 having a specified diameter related to a specified length of a PVC workpiece, such that one rotation of the roller corresponds to the length of a coated surface of the workpiece. For example, referring to FIG. 8, a roller 220 may have a specified diameter 222 to provide a repeatable six foot coating in one completed rotation of the roller 220.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A method for coating a vinyl workpiece, comprising:
deionizing air around a workpiece comprised of Polyvinyl Chloride (PVC), the work piece comprising a planar top surface and edges bordering the planar top surface;
denibbing the workpiece;
roll coating the planar top surface of the workpiece using a roll coating machine comprising a plurality of engraved rollers, at least one of the engraved rollers having an engraved image for printing the engraved image on the planar top surface of the workpiece;
roll coating the edges of the workpiece through a first application roller having a hardness of 30 shore and a second application roller having a hardness of 18 shore, the first application roller and the second application roller being disposed about 45 degrees with respect to the planar top surface;
coating the workpiece with an ultraviolet (UV) curable coating using a vacuum coating machine; and
curing the UV coating using the vacuum coating machine for applying a clear coat.

2. The method of claim 1, wherein the workpiece is selected from a group consisting of: a fence post, a fence rail, and a fence end cap.

3. The method of claim 1, wherein the workpiece comprises a PVC fence rail having a substantially rectangular cross section and the workpiece comprises top and bottom planar surfaces, and
wherein the workpiece comprises at least one vertical surface at a 90 degree angle from the top and bottom surfaces, and comprises an inclined surface which angularly extends from the top and bottom surfaces.

4. The method of claim 1, wherein the workpiece comprises a fence post with a substantially square cross section, and the fence post comprises four planar sides.

5. The method of claim 1, wherein the step of deionizing is accomplished using at least one deionizing air gun.

6. The method of claim 1, further comprising:
determining a specified diameter of a roller related to a specified length of the workpiece, such that one rotation of the roller corresponds to the length of a coated surface of the workpiece.

7. The method of claim 1, further comprising:
independently coating two different workpieces using a single roller having two sections respectively corresponding to each of the two different workpieces.

8. The method of claim 7, wherein the two sections are each about 24 inches in length.

9. The method of claim 1, further comprising:
repeating the steps of claim 1 for a bottom surface of the workpiece.

10. The method of claim 1, further comprising roll coating an angular surface of the workpiece through a corresponding angularly positioned application roller, the angular surface forming a predetermined angle with respect to the top planar surface of the workpiece and being connected to the top planar surface through at least one of the edges, the angularly positioned application roller being positioned at a predetermined angle with respect to the planar top surface of the workpiece and having a predetermined hardness.

* * * * *